US006615480B1

(12) United States Patent
Murphy

(10) Patent No.: US 6,615,480 B1
(45) Date of Patent: Sep. 9, 2003

(54) MULTI-PIECE PUNCH DOWN BLADE ASSEMBLY

(75) Inventor: Stacey A. Murphy, DeKalb, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 09/715,501

(22) Filed: Nov. 17, 2000

(51) Int. Cl.[7] .......................... B23P 19/02; H01R 43/20

(52) U.S. Cl. .......................... 29/566.4; 29/751; 29/758; 7/107

(58) Field of Search ............................ 29/566.4, 566.3, 29/751, 758, 750; 7/107; 30/339, 349, 353; 407/67, 108, 107

(56) References Cited

U.S. PATENT DOCUMENTS

| | | | | | |
|---|---|---|---|---|---|
| 3,708,852 | A | * | 1/1973 | Mason | 29/566.4 |
| 3,710,406 | A | * | 1/1973 | Stanford | 7/107 |
| 3,825,981 | A | * | 7/1974 | Cochran et al. | 407/67 |
| 3,875,601 | A | * | 4/1975 | Kaufman | 7/107 |
| 3,896,534 | A | * | 7/1975 | Kaufman et al. | 29/566.4 |
| 4,054,977 | A | * | 10/1977 | Plummer | 407/108 |
| 4,161,061 | A | * | 7/1979 | Mason et al. | 29/566.4 |
| 4,194,256 | A | * | 3/1980 | Knickerbocker | 29/566.4 |
| 4,241,496 | A | * | 12/1980 | Gregson | 29/566.4 |
| 4,408,391 | A | * | 10/1983 | Pohl | 29/751 |
| 4,656,725 | A | * | 4/1987 | Knickerbocker | 29/566.4 |
| 5,673,955 | A | * | 10/1997 | Neubauer | 294/118 |

* cited by examiner

*Primary Examiner*—A. L. Wellington
*Assistant Examiner*—Erica Cadugan
(74) *Attorney, Agent, or Firm*—Cook, Alex, McFarron, Manzo, Cummings & Mehler, Ltd.

(57) ABSTRACT

A blade assembly for a punch down tool includes a base member having a mounting block. The mounting block is releasably attachable to the chuck of a punch down tool. First and second extensions are connected to the mounting block. Each extension terminates at a wire-engaging head and has a blade-receiving shoe formed therein. First and second cutting blades are mounted on the first and second blade-receiving shoes, respectively. Each cutting blade has a cutting edge that extends beyond the end of its associated wire-engaging head. The cutting blades are fastened to the shoes by attachment elements that may be ultrasonically welded to the blades. A notch or groove receives a base edge of the cutting surface. The body member is made of glass-filled plastic while the cutting blade is metal.

40 Claims, 4 Drawing Sheets

Fig. 5.
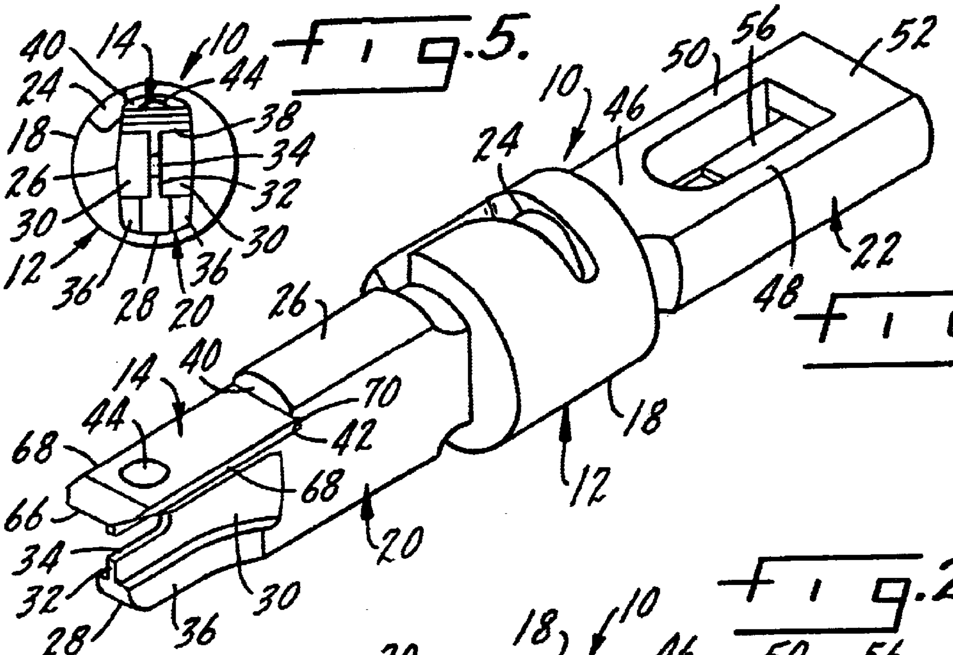
Fig. 1.
Fig. 2.
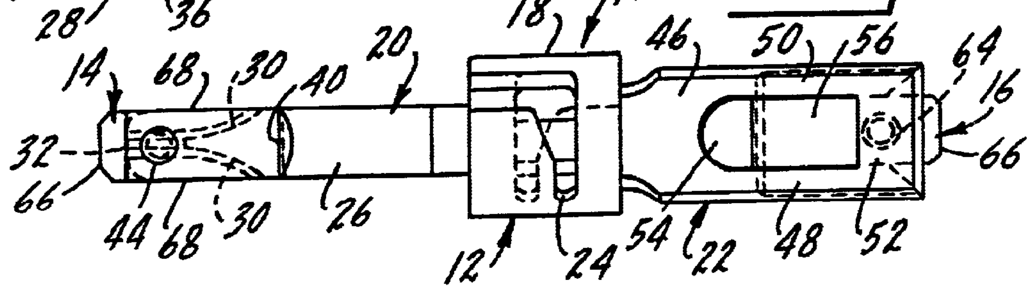
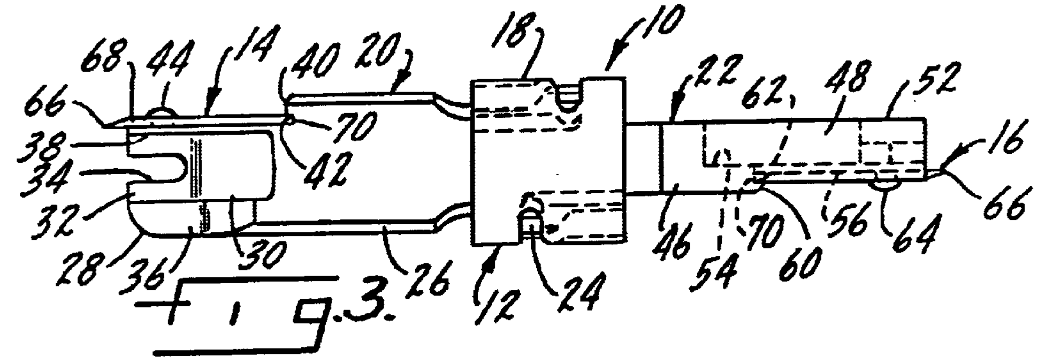
Fig. 3.
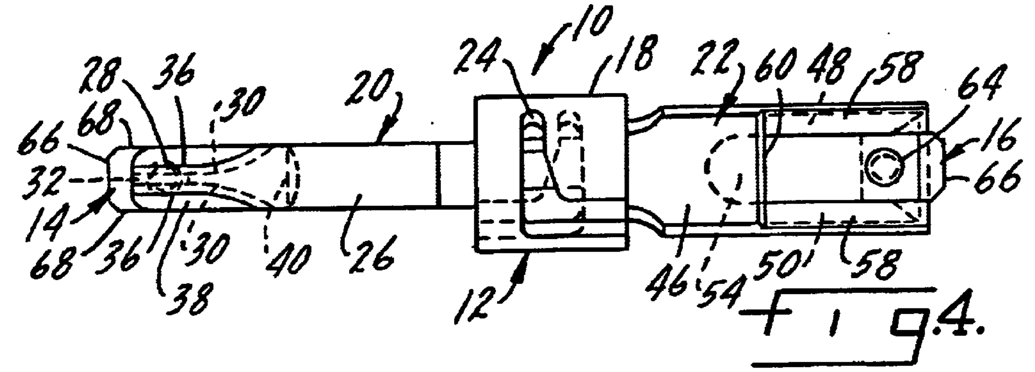
Fig. 4.

Fig. 11.
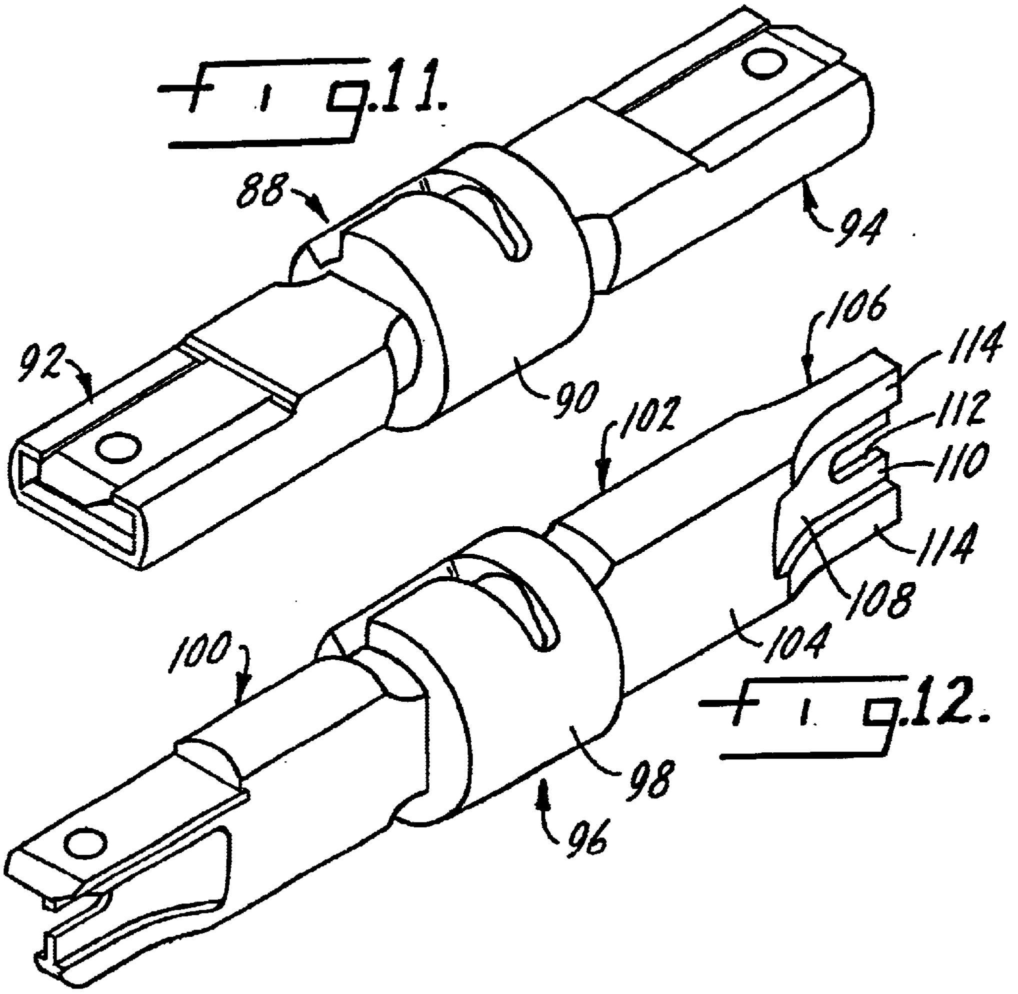
Fig. 12.
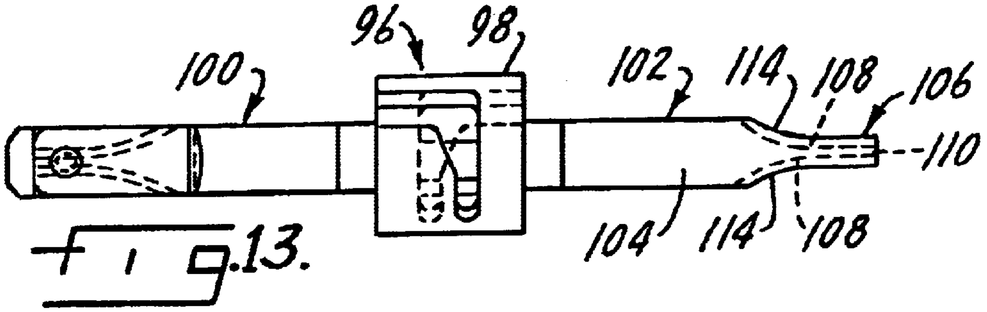
Fig. 13.
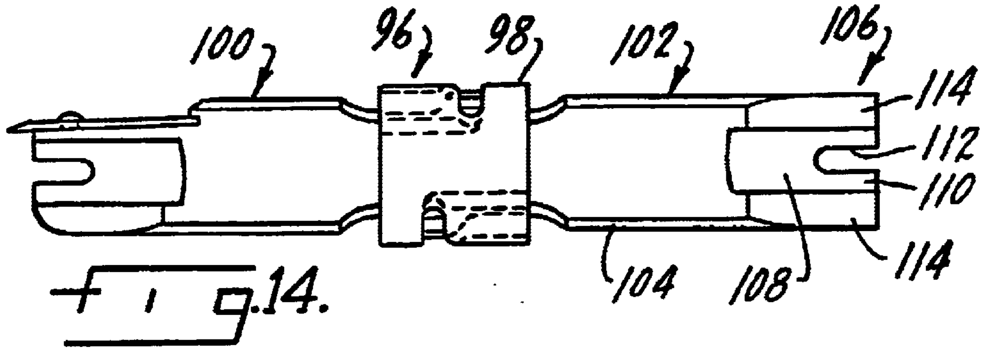
Fig. 14.

MULTI-PIECE PUNCH DOWN BLADE ASSEMBLY

BACKGROUND OF THE INVENTION

The present invention relates to blades for termination tools which connect wires to an array of insulation displacement terminal clips, such as those used on a patch panel or the like. Such tools are commonly referred to as punch down tools because they assist in pushing the wires down between the prongs of the termination clips. Typically, the blades are reversible and have two opposite ends. One of the ends may have a cutting edge which trims a wire just beyond the terminal clip while the other end may have a non-cutting, seating only, edge which seats the wire in the clip without cutting the wire. Common blade types are the 66-type, which is generally used in the telephone industry to connect to a 66 terminal, and the 110-type, which is used for 110 data and computer terminals. A punch down tool of this general character is shown in U.S. Pat. No. 4,241,496, the disclosure of which is incorporated herein by reference.

During insertion of a wire into a terminal clip, the seating edge of the blade end spreads the terminal prongs to allow insertion of the wire into the terminal. As the wire is pressed into the terminal clip, the clip itself will split, pierce or otherwise displace the insulation to allow the terminal to make electrical contact with the wire's underlying conductor. If the blade end is a non-cutting or seating only edge, then the wire will be pushed into the terminal clip without any trimming occurring. If the blade end has both a seating and cutting edge, then the wire is pushed into the terminal clip and the blade simultaneously trims a portion of wire which protrudes from the clip.

In order to push the wire into the terminal clip and displace the insulation, a large force must be applied to the tool. Over time punch down tools and blades undergo a high number of wire installations and must withstand the force from numerous impacts in every blade and terminal setting. Thus, they must be highly durable and strong. The difficulty in forming the blade is compounded where a seating edge and a cutting edge are combined on one end of the blade. The material comprising the blade not only has to have characteristics of strength and durability, but the properties of the material have to provide both cutting and seating edges.

Traditionally blades have been made of only one piece of material because the formation and material of the blades are driven by the required performance characteristics. Prior punch down blades are made of cast steel which provided the required strength and durability needed by the blade. Steel also satisfies the combined characteristics of strength of the seating edge for pushing the wire into the termination clip and sharpness of the cutting edge for termination of the wire at the clip.

Steel further can withstand the force which occurs when an internal spring-loaded, impact mechanism is used. The impact mechanism applies consistent impact during the punch down operation and reduces the effort required by the operator to terminate and cut wiring for a proper connection. When the operator pushes down on the tool, the spring is compressed and causes corresponding compression in the tool head which holds the blade. After a predetermined force has been applied to the spring, it is unseated and returns the tool head and blade to the uncompressed length thus causing an immediate push down force to be applied to the wire and terminal connection. While the impact mechanism is intended to reduce operator fatigue, it does not reduce the amount of force which is being applied to the blade. As a result, the impact mechanism has reinforced the traditional belief that the blade construction be a one-piece construction of steel.

However, using all steel to make the blade can be relatively costly and the finishing steps to provide a dual cutting and seating edge made of steel can be time consuming. There is a need to provide a blade which is less costly to make while also providing a blade which meets the same durability, strength and cutting requirements. It is also advantageous to provide a blade which is made of several pieces of material instead of one cast piece.

The present invention provides a multi-piece punch down blade assembly where two or more pieces are combined to form a blade assembly with a minimum of attachment points. Particularly, a cutting edge of the blade assembly is separately attached to the blade assembly by one or more attachment points. The pieces of the blade assembly can be made of different materials.

SUMMARY OF THE INVENTION

The punch down blade assembly of the present invention has a base member which includes a mounting block and at least one extension connected at one end to the mounting block. The other, free end of the extension terminates at a wire-engaging head. A blade-receiving shoe is formed in or on the extension. The extension also has an abutment adjacent the shoe and overlying it slightly to form a notch. An attachment element extends from the shoe. The notch and attachment element retain a cutting blade on the shoe. The cutting blade has a front or cutting edge that extends beyond the end of the wire-engaging head. The cutting blade has a rear edge that fits into the notch to engage the abutment. The base member is preferably made of glass filled plastic, such as nylon. The cutting blade is preferably made of steel.

The present invention provides a blade assembly which can be made at a lower cost than current blades while still providing a strong, durable blade and sharp cutting edge that can withstand repeated terminations.

BRIEF DESCRIPTION OF THE DRAWINGS

FIG. 1 is a perspective view of a 110/66 combination blade assembly of the present invention.

FIG. 2 is top plan view of the blade assembly of FIG. 1. While the designation of top and bottom is somewhat arbitrary, throughout the various views the top and bottom will be considered to be in accordance with the orientation shown in the perspective views.

FIG. 3 is a side elevation view of the blade assembly.

FIG. 4 is a bottom plan view of the blade assembly.

FIG. 5 is a left end elevation view of the blade assembly.

FIG. 11 is a perspective view of a further alternate embodiment, a double cut 66-type blade assembly.

FIG. 12 is a perspective view of yet another alternate embodiment of the invention, a single cut 110-type blade assembly.

FIG. 13 is a top plan view of the blade assembly of FIG. 12.

FIG. 14 is a front elevation view of the FIG. 12 blade assembly.

DETAILED DESCRIPTION OF THE INVENTION

Figure 10:
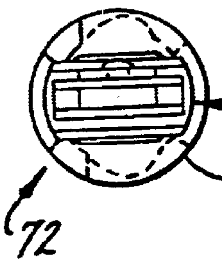
FIG. 10 is an end elevation view, looking from the right end of FIG. 9.
Figure 6:
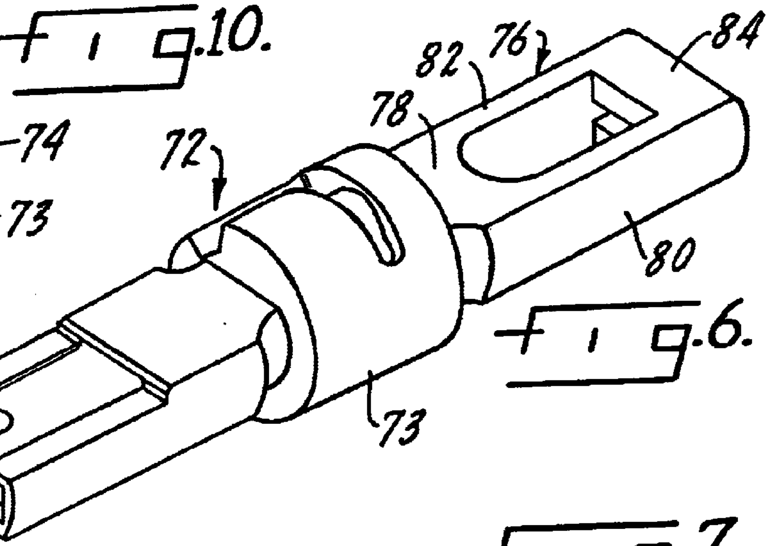
FIG. 6 is a perspective view of an alternate embodiment of the invention, a single cut 66-type blade assembly.
Figure 7:
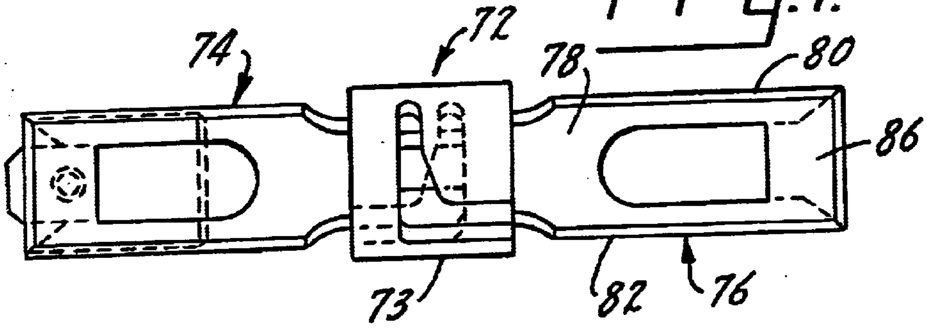
FIG. 7 is a bottom plan view of the blade assembly of FIG. 6.
Figure 8:
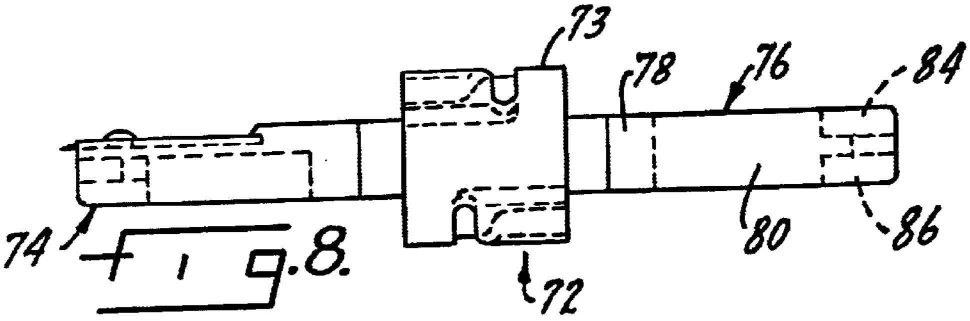
FIG. 8 is a side elevation view of the blade assembly of FIG. 6.
Figure 9:
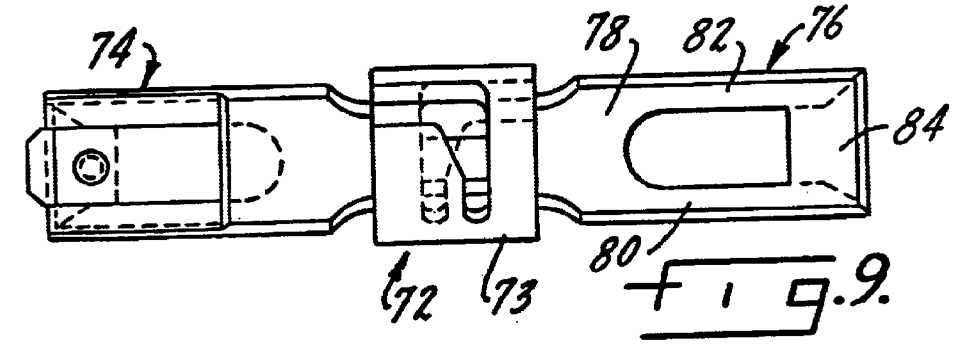
FIG. 9 is a top plan view of the FIG. 6 blade assembly.

The present invention relates to a multi-piece punch down blade assembly shown generally at 10 in FIGS. 1–5. The blade assembly 10 has a base member 12 to which one or more cutting blades 14 and 16 are attached. The base member 12 includes a mounting block 18, a first extension 20 and a second extension 22. The extensions are connected at one end to the mounting block 18. Any of a number of materials could be used to make the base member, but glass-filled plastic such as that sold under the trademark Celcon® by Celanese Corporation is preferred. Nylon could also be used. A glass-to-plastic ratio of at least approximately 25% glass is preferred in order to give the base member the necessary durability to withstand repeated installations. The cutting blades 14, 16 can be separately constructed of a thin piece of metal such as steel, stainless steel or the like. Those skilled in the art will recognize that first extension 20 forms a 110-type blade and second extension 22 forms a 66-type blade. Other combinations of these two blade types are shown below. Although only two blade types are shown, it is contemplated that many other blade types are possible to use with the invention.

The mounting block 18 preferably has a generally cylindrical shape to fit the standard chuck of most punch down tools. The surface of the mounting block 18 may also have: a plurality of grooves, slots or the like to form a locking element 24. The locking element 24 is shown as two L-shaped grooves. The grooves engage a projection in the punch down tool in a bayonet-type fit to secure the blade assembly 10 within the tool upon lengthwise and rotary motion being applied to the blade assembly.

The first extension 20 has a rectangular main section 26 that joins the mounting block 18. The main section merges into a wire-engaging head 28 that is defined by a pair of ramp surfaces 30. The ramp surfaces slope toward one another from the main section to a narrow tip wall 32. A U-shaped wire receiving socket 34 is formed in the tip wall at the end thereof. The socket 34 is arranged to receive a wire to be pushed down into a terminal clip. Beneath the ramp surfaces 30 and tip wall 32 the head 28 includes a pair of ribs 36, as best seen in FIG. 3. The ribs neck down to a thickness less than that of the main section 26 but somewhat greater than the ramp surfaces or tip wall. A blade-receiving shoe 38 is formed on top of the ramp surfaces 30 and tip wall 32. As seen in FIGS. 4 and 5, the shoe is a surface having a width equal to that of the main section 26 and greater than the tip wall 32. The main section 26 extends above the shoe 38 to form an abutment 40. The abutment includes a portion that overlies the shoe surface to form a notch 42. A rear edge of the cutting blade 14 fits into the notch to engage the abutment. A projection 44 extends upwardly from the shoe 38 to engage the cutting blade and retain it on the shoe.

Looking now at the second extension 22, it has a main section 46 connected to the mounting block 18. A wire-engaging head is defined by two arms 48 and 50, upper and lower webs 52 and 54, and a blade-receiving shoe 56. The arms 48, 50 are spaced from one another and extend axially from the main section 46. The arms are joined near the main section by the lower web 54 and near their free ends by the upper web 52. The shoe 56 forms a surface that spans the space between the arms although the shoe is recessed somewhat above (as seen in FIG. 3) the lower edges of the arms. This forms small ledges 58 (FIG. 4) that extend beyond the surface of the shoe. The ledges adjoin the side edges of the cutting blade to help retain it in place. The forward edge of the lower web 54 forms an abutment 60 adjacent one end of the shoe. The abutment defines a notch 62 for receiving the rear edge of the cutting blade 16. A projection 64 extends from the shoe 56 to engage the cutting blade 16 and retain it on the shoe.

The cutting blades 14 and 16 each have a cutting edge 66, side edges 68 and a rear edge 70. The cutting blades also have a hole which is sized and positioned to receive the projection 44 or 64 therein when the cutting blade is mounted on one of the shoes 38 or 56. The projection is then ultrasonically welded to fix the blade in position. The engagement between the projections 44, 64 and the holes aids in positioning and securing the cutting blade on the base member. Likewise, the notches 42 and 62 receive the cutting surface rear edge 70 and help to secure the cutting blade. It is contemplated that attachment of the cutting blades to the base member could occur by any method. By way of example, but not limitation, these methods can include ultrasonic welding, insert molding, riveting and gluing. The preferred attachment point allows for ultrasonic welding to occur at the projections 44, 64 thus providing attachment of the cutting blades by a single weld or attachment point. Additional attachment points are possible such as additional projections or grooves although it is advantageous to keep the number of attachment points to a minimum in order to save time in the production process.

During use, the blade assembly 10 allows for seating and cutting of electrical conductors at the terminal clip. The multi-piece blade assembly 10 withstands high volume installations and force from numerous impacts. Despite being comprised of several pieces, the blade assembly is highly durable and strong and can provide dual cutting and seating edges for termination of the wire at the clip.

It can be seen that the version of FIGS. 1–5 has two types of extensions, a 66-type cutting extension and a 110-type cutting extension. Variations of the extension types are envisioned by the present invention, including non-cutting 66-type and 110-type extensions and various combinations of these four extension types. Some of these possibilities will now be described. Parts that are the same or essentially the same as those previously described will be given common reference numerals. Each of these variations uses a glass-filled plastic base member and a metal cutting blade.

In FIGS. 6–10 a blade assembly 72 has a mounting block 73 and two 66-type extensions, a cutting extension 74 that is the same as second extension 22 and a non-cutting extension 76. The non-cutting extension is similar to the cutting extension except that no shoe or abutment is provided. The non-cutting extension has a main section 78 and two longitudinally extending arms 80, 82 joined at their free ends by upper and lower webs 84, 86.

FIG. 11 shows another variation of a blade assembly 88 having a mounting block 90 and two 66-type cutting extensions 92, 94. These extensions are essentially similar to extension 22 and their description will not be repeated.

FIGS. 12–14 illustrate a further alternate embodiment of a blade assembly 96. This version has a mounting block 98 carrying a 110-type cutting extension 100 that is the same as first extension 20 and a 110-type non-cutting extension 102. The non-cutting extension has a main section 104 that merges into a wire-engaging head 106. The head includes a pair of ramp surfaces 108. The ramp surfaces slope toward one another from the main section to a narrow tip wall 110. A U-shaped wire receiving socket 112 is formed in the tip wall at the end thereof. The socket 112 is arranged to receive a wire to be pushed down into a terminal clip. The head 106 also includes a pair of ribs 114 above and below the ramp surfaces 108 and tip wall 110. The ribs neck down to a thickness less than that of the main section 104 but somewhat greater than the ramp surfaces or tip wall.

Figure 15:
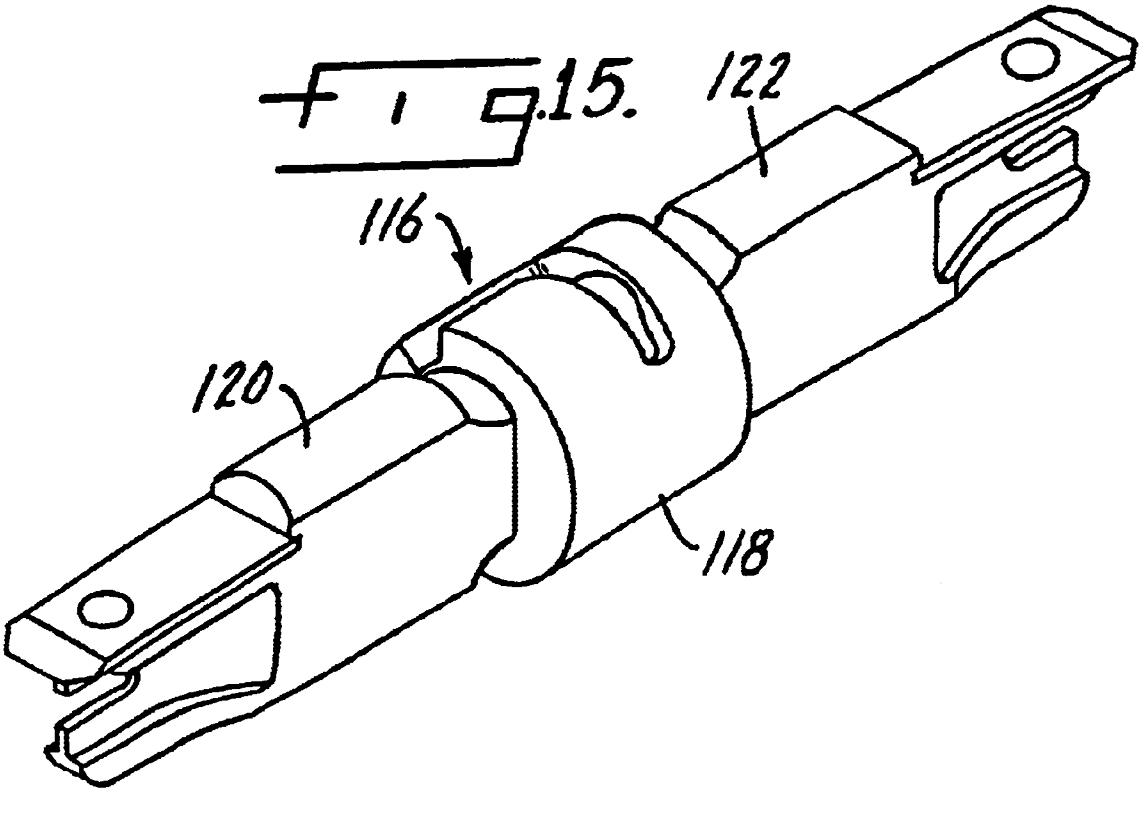
FIG. 15 is a perspective view of a still another alternate embodiment, a double cut 110-type blade assembly.

FIG. 15 shows another variation of a blade assembly 116 having a mounting block 118 and two 110-type cutting extensions 120, 122. These extensions are essentially similar to extension 20 and their description will not be repeated.

While a preferred form of the invention has been shown and described, it will be realized that alterations and modifications may be made thereto without departing from the scope of the following claims. For example, while a reversible blade assembly is illustrated, the blade assembly could have only one extension and cutting blade. Other combinations of extensions, as to both blade type and cutting or non-cutting, could be made to suit a particular application.

What is claimed is:

1. A blade assembly for use in a punch down tool having a movable, internal, spring-loaded, impact mechanism used to electrically connect a wire to a termination clip, the blade assembly comprising:

a base member having a mounting block and an extension, the extension having one end connected to the mounting block and an other end opposite the one end, the extension terminating at the other end at a wire-engaging head and having a blade-receiving shoe formed in the extension at the other end, the mounting block including means for connecting the blade assembly to a said tool;

a cutting blade mounted on the blade-receiving shoe, the cutting blade having a cutting edge that extends beyond an end of the wire-engaging head at one end of the blade and the cutting blade further having an end surface that abuts an abutment adjacent the blade-receiving shoe at an opposite end of the blade.

2. The blade assembly of claim 1 further comprising an attachment element on said shoe, the attachment element being engageable with the cutting blade for securing the cutting blade to the extension.

3. The blade assembly of claim 2 wherein the attachment element comprises at least one projection disposed on said shoe.

4. The blade assembly of claim 3 wherein the cutting blade includes an opening through it for receiving the at least one projection.

5. The blade assembly of claim 1 wherein the abutment is part of the extension.

6. The blade assembly of claim 5 wherein the abutment overlies the shoe to define a notch which receives the rear edge of the cutting blade.

7. The blade assembly of claim 5 wherein the cutting blade includes a pair of side edges perpendicular to the cutting edge and the extension further comprises first and second ledges adjacent the shoe, the side edges of the cutting blade being engaged by the ledges.

8. The blade assembly of claim 1 further comprising:

a second extension connected to the mounting block, the second extension terminating at a wire-engaging head and having a second blade-receiving shoe formed therein;

a second cutting blade mounted on the blade-receiving shoe of the second extension, the second cutting blade having a cutting edge that extends beyond an end of the wire-engaging head of the second extension.

9. The blade assembly of claim 1 wherein the base member is made of molded glass-filled plastic and the cutting blade is made of metal.

10. The blade assembly of claim 1 wherein the means for connecting the blade assembly to a said tool is releasable.

11. A blade assembly for use in a punch down tool having a movable, internal, spring-loaded, impact mechanism used to electrically connect a wire to a termination clip, the blade assembly comprising:

a base member having a mounting block and first and second extensions, the extensions each having one end connected to the mounting block and an other end opposite the one end, the extensions each terminating at the other end at a wire-engaging head and having a blade-receiving shoe formed in each extension at the respective other end, the mounting block including means for connecting the blade assembly to a said tool;

first and second cutting blades mounted on the blade-receiving shoes of the first and second extensions, respectively, each cutting blade having a cutting edge that extends beyond an end of the wire-engaging head of the respective extension at one end of the respective blade and each cutting blade having an end surface that abuts a respective abutment adjacent each of the blade-receiving shoes at an opposite end of the respective blade.

12. The blade assembly of claim 11 further comprising first and second attachment elements mounted on the blade-receiving shoes of the first and second extensions, respectively, the attachment elements being engageable with the respective cutting blade on its respective extension for securing said respective cutting blade to the respective extension.

13. The blade assembly of claim 12 wherein each of the first and second attachment elements comprises at least one projection.

14. The blade assembly of claim 13 wherein each of the first and second cutting blades includes an opening through it for receiving the at least one projection of the respective attachment element.

15. The blade assembly of claim 11 wherein each of the abutments forms part of the respective extension.

16. The blade assembly of claim 15 wherein each abutment on each extension overlies its respective shoe to define a notch which receives the end surface of the cutting blade associated with that extension.

17. The blade assembly of claim 15 wherein one of the cutting blades includes a pair of side edges perpendicular to the respective cutting edge and the extension supporting said one cutting blade further comprises first and second ledges adjacent the respective shoe, the side edges of the one cutting blade being engaged by the ledges.

18. The blade assembly of claim 11 wherein the base member is made of molded glass-filled plastic and the cutting blade is made of metal.

19. The blade assembly of claim 11 wherein the means for connecting the blade assembly to a said tool is releasable.

20. The blade assembly of claim 19 wherein the means for connecting is an L-shaped groove.

21. A blade assembly for use in a punch down tool having a movable, internal, spring-loaded, impact mechanism used to electrically connect a wire to a termination clip, the blade assembly comprising:

a base member having a mounting block and an extension, the extension having one end connected to the mounting block and an other end opposite the one end, the extension terminating at the other end at a wire-engaging head and having a blade-receiving shoe formed in the extension at the other end, the mounting block connecting the blade assembly to said tool;

a cutting blade mounted on the blade-receiving shoe, the cutting blade having a cutting edge that extends beyond an end of the wire-engaging head at one end of the blade and the blade further having an end surface that abuts an abutment adjacent the blade-receiving shoe at an opposite end of the blade.

22. The blade assembly of claim 21 further comprising an attachment element on said shoe, the attachment element being engageable with the cutting blade for securing the cutting blade to the extension.

23. The blade assembly of claim 22 wherein the attachment element comprises at least one projection disposed on said shoe.

24. The blade assembly of claim 23 wherein the cutting blade includes an opening through it for receiving the at least one projection.

25. The blade assembly of claim 21 wherein the abutment is part of the extension.

26. The blade assembly of claim 25 wherein the abutment overlies the shoe to define a notch which receives the end surface of the cutting blade.

27. The blade assembly of claim 25 wherein the cutting blade includes a pair of side edges perpendicular to the cutting edge and the extension further comprises first and second ledges adjacent the shoe, the side edges of the cutting blade being engaged by the ledges.

28. The blade assembly of claim 21 further comprising:

a second extension connected to the mounting block, the second extension terminating at a wire-engaging head and having a second blade-receiving shoe formed therein;

a second cutting blade mounted on the blade-receiving shoe of the second extension, the second cutting blade having a cutting edge that extends beyond an end of the wire-engaging head of the second extension.

29. The blade assembly of claim 21 wherein the base member is made of molded glass-filled plastic and the cutting blade is made of metal.

30. The blade assembly of claim 21 wherein the mounting block further comprises a releasable locking element for locking the blade assembly in the tool.

31. A blade assembly for use in a punch down tool having a movable, internal, spring-loaded, impact mechanism used to electrically connect a wire to a termination clip, the blade assembly comprising:

a base member having a mounting block and first and second extensions, the extensions each having one end connected to the mounting block and an other end opposite the one end, the extensions each terminating at the other end at a wire-engaging head and having a blade-receiving shoe formed in each extension at the respective other end, the mounting block connecting the blade assembly to said tool;

first and second cutting blades mounted on the blade-receiving shoes of the first and second extensions, respectively, each cutting blade having a cutting edge that extends beyond an end of the wire-engaging head of the respective extension at one end of the respective blade and each cutting blade having an end surface that abuts a respective abutment adjacent each of the blade-receiving shoes at an opposite end of the respective blade.

32. The blade assembly of claim 31 further comprising first and second attachment elements mounted on the blade-receiving shoes of the first and second extensions, respectively, the attachment elements being engageable with the respective cutting blade on its respective extension for securing said respective cutting blade to the respective extension.

33. The blade assembly of claim 32 wherein each of the first and second attachment elements comprises at least one projection.

34. The blade assembly of claim 33 wherein each of the first and second cutting blades includes and opening through it for receiving the at least one projection of the respective attachment element.

35. The blade assembly of claim 31 wherein each of the abutments forms part of the respective extension.

36. The blade assembly of claim 35 wherein each abutment on each extension overlies its respective shoe to define a notch which receives the end surface of the cutting blade associated with that extension.

37. The blade assembly of claim 35 wherein one of the cutting blades includes a pair of side edges perpendicular to the respective cutting edge and the extension supporting said one cutting blade further comprises first and second ledges adjacent the respective shoe, the side edges of the one cutting blade being engaged by the ledges.

38. The blade assembly of claim 31 wherein the base member is made of molded glass-filled plastic and the cutting blades are made of metal.

39. The blade assembly of claim 31 wherein the mounting block further comprises a releasable locking element for locking the blade assembly in the tool.

40. The blade assembly of claim 39 wherein the locking element is an L-shaped groove.

* * * * *

UNITED STATES PATENT AND TRADEMARK OFFICE
CERTIFICATE OF CORRECTION

PATENT NO. : 6,615,480 B1
DATED : September 9, 2003
INVENTOR(S) : Stacey A. Murphy It is certified that error appears in the above-identified patent and that said Letters Patent is hereby corrected as shown below:

Title page,
Item [*] Notice, delete the phrase "by 0 days" and insert -- by 10 days --

Signed and Sealed this

Twenty-eighth Day of September, 2004

JON W. DUDAS
*Director of the United States Patent and Trademark Office*